UNITED STATES PATENT OFFICE.

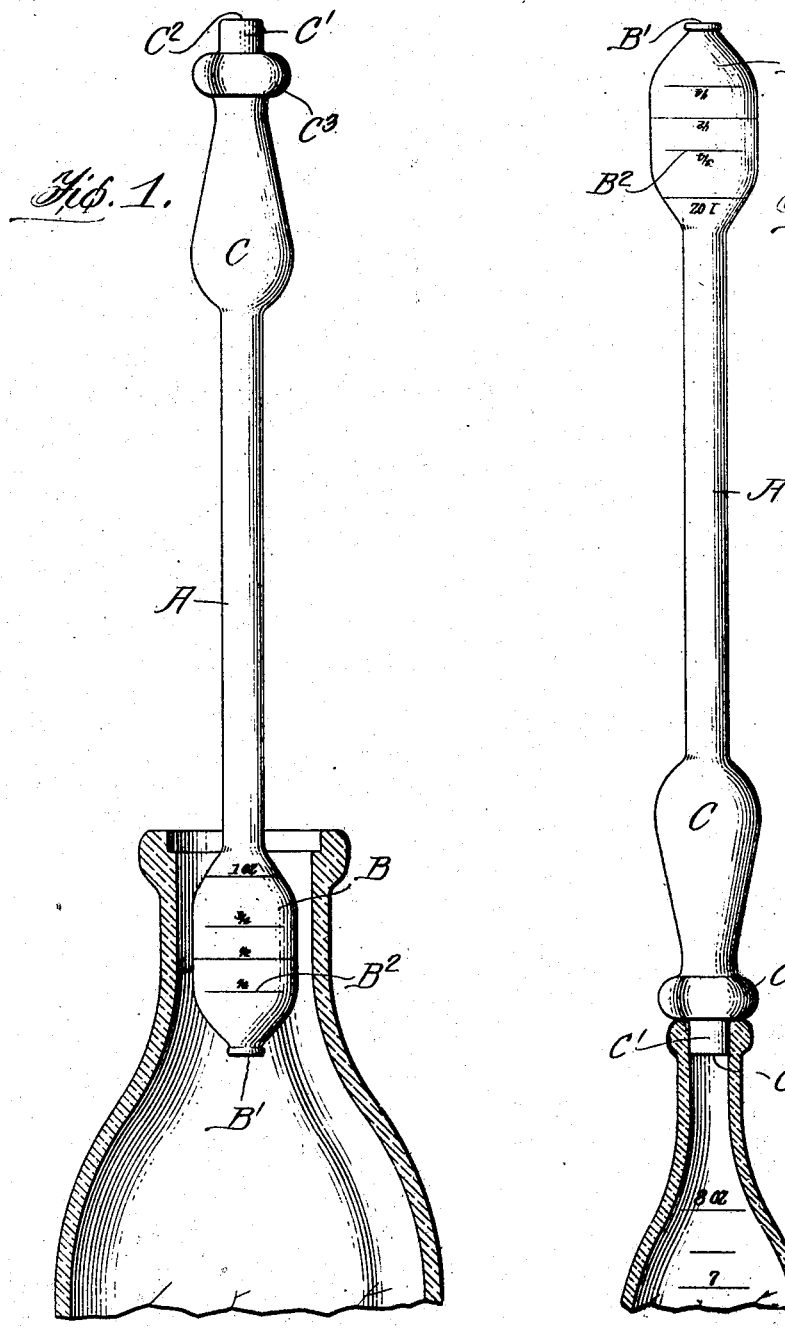

ARTHUR CLARKSON BUTTS, JR., OF NEW YORK, N. Y.

CREAM-DIPPER.

936,757.  Specification of Letters Patent.  Patented Oct. 12, 1909.

Application filed March 30, 1908. Serial No. 424,245.

*To all whom it may concern:*

Be it known that I, ARTHUR C. BUTTS, Jr., a citizen of the United States, residing in New York city, State of New York, have invented a new and useful Improvement in Cream-Dippers, of which the following is a specification.

This invention relates generally to cream dippers and more particularly to one which is especially adapted for use in the preparation of modified milk commonly employed in feeding infants, and the object of the invention is to provide an exceedingly simple and highly efficient device by means of which the exact quantity of the proper grade of ingredients can be quickly and easily removed.

With these objects in view, my invention consists in the novel features of construction, hereinafter fully described and pointed out in the claims.

In the drawing forming a part of this specification:—Figure 1 is a side elevation of the device constructed in accordance with my invention. Fig. 2 is a similar view showing the device inverted and the upper end inserted in the neck of a nursing bottle.

In carrying out my invention I employ a glass tube A which may be of any suitable size and which has a bulb B formed upon the lower end thereof, the extreme lower end of said bulb being open as shown at B', and through which the cream or milk to be withdrawn enters the bulb. This bulb is preferably made to contain one ounce and the exterior thereof has graduations cut thereon, indicating definite fractional parts of an ounce, and these graduation marks $B^2$ are made very prominent so that they may be seen through the milk or cream, thereby enabling the operator to see when the bulb has been lowered to the proper extent. A bulb C is also formed upon the upper end of the tube A, said bulb being of peculiar formation inasmuch as it is larger at the bottom than at the top and terminates in a nipple C' having an opening $C^2$ in the end thereof, and at the lower end of this nipple is the annular swell or enlargment $C^3$. A bulb constructed as herein shown and described forms an exceedingly convenient handle for holding the device while the bulb is being lowered into the cream or milk, and furthermore, when it is desired to discharge the measured quantity of cream or milk into the nursing bottle, the nipple C' can be inserted in the mouth of a nursing bottle, and the measured contents quickly and easily poured into said nursing bottle without loss.

The operation of my invention will be obvious to every one, as it is well known that if the lower bulb is lowered into a bottle or other vessel containing milk or cream the said milk or cream will pass up into the said bulb and then by closing the opening $C^2$ the milk or cream can be raised when the bulb is raised and the measured contents can be then transferred into the nursing bottle or other receptacle. The bulb B is graduated so that when it is desired to remove a definite quantity of milk, cream or other liquid, the bulb is lowered until the top of the liquid reaches the proper graduation, and then by closing the upper opening, the measured quantity can be removed.

It will thus be seen that I provide an exceedingly cheap and simple and highly efficient construction of dipper capable of carrying out all of the objects hereinbefore referred to.

Having thus fully described my invention, what I claim as new and desire to secure by Letters Patent is:—

1. A cream dipper comprising a tube having a bulb at its upper end, the upper end of said bulb terminating in a nipple, a bulb formed upon the lower end of the tube open at its lower end and having graduations marked upon the bulb, as set forth.

2. A cream dipper comprising a tube having a bulb at its upper end, said bulb terminating in a nipple and having an annular enlargement at the base of said nipple, and a bulb formed upon the lower end of the tube open at its lower end, and provided with graduations to indicate fractional portions of a definite measure.

ARTHUR CLARKSON BUTTS, JR.

Witnesses:
 WILLIAM H. CORSA,
 FLORENCE C. NUTTALL.